(12) United States Patent
Yamagishi et al.

(10) Patent No.: US 7,297,970 B2
(45) Date of Patent: Nov. 20, 2007

(54) FLAME DETECTOR

(75) Inventors: Takatoshi Yamagishi, Tokyo (JP); Kazuhisa Nakano, Tokyo (JP); Hidesato Morita, Tokyo (JP)

(73) Assignee: Nohmi Bosai Ltd., Tokyo (JP)

( * ) Notice: Subject to any disclaimer, the term of this patent is extended or adjusted under 35 U.S.C. 154(b) by 0 days.

(21) Appl. No.: 11/385,759

(22) Filed: Mar. 22, 2006

(65) Prior Publication Data
US 2006/0226995 A1    Oct. 12, 2006

(30) Foreign Application Priority Data
Mar. 29, 2005  (JP) .............................. 2005-095429
Mar. 29, 2005  (JP) .............................. 2005-095430

(51) Int. Cl.
*G08B 17/12*    (2006.01)
(52) U.S. Cl. ................................. 250/554; 250/339.15
(58) Field of Classification Search ................ 250/554, 250/339.14, 339.05, 339.15
See application file for complete search history.

(56) References Cited

U.S. PATENT DOCUMENTS

| | | | |
|---|---|---|---|
| 2,697,824 A * | 12/1954 | Norton et al. ............... | 340/515 |
| 4,665,390 A * | 5/1987 | Kern et al. .................. | 340/587 |
| 4,742,236 A | 5/1988 | Kawakami et al. | |
| 5,237,512 A | 8/1993 | Davidson | |
| 5,365,223 A * | 11/1994 | Sigafus .................... | 340/693.1 |
| 5,850,182 A | 12/1998 | Schuler | |
| 6,384,414 B1 | 5/2002 | Fisher et al. | |

FOREIGN PATENT DOCUMENTS

| | | |
|---|---|---|
| EP | 1 233 386 | 8/2002 |
| JP | 2003-106898 | 4/2003 |
| JP | 2004-4023 | 1/2004 |

* cited by examiner

*Primary Examiner*—John R. Lee
(74) *Attorney, Agent, or Firm*—Wenderoth, Lind & Ponack, L.L.P.

(57) ABSTRACT

A flame detector having the following features is capable of simple and reliable determination of the occurrence or nonoccurrence of fire resulting from a flame based on waveforms detected from detection signals from infrared sensors. The flame detector includes an infrared sensor for detecting an infrared ray, a RAM serving as a waveform storing unit for storing a plurality of waveforms detected from an output signal from the infrared sensor, and a CPU serving as a wavelength determining unit for determining succession of waveforms when at least a first predetermined number of waveforms stored in the RAM are produced for a first predetermined time and at least a second predetermined number of waveforms different from the first predetermined number of waveforms are produced for a second predetermined time different from the first predetermined time.

12 Claims, 6 Drawing Sheets

| WAVEFORM | P1 | P2 | ····· | P12 |
|---|---|---|---|---|
| TIME STAMP | t1 | t2 | ····· | t12 |
| WAVEFORM HEIGHT | h1 | h2 | ····· | h12 |
| PULSE WIDTH | w1 | w2 | ····· | w12 |
| MAIN WAVELENGTH/ SUB WAVELENGTH | r1 | r2 | ····· | r12 |

FLAME DETECTOR

BACKGROUND OF THE INVENTION

1. Field of the Invention

The present invention relates to a flame detector for determining presence or absence of flame fluctuation, and more particularly to a flame detector capable of simply and reliably detecting the flame fluctuation.

2. Description of the Related Art

In order to distinguish a flame of fire to be determined from, for example, a high-temperature object except for the flame, which causes a false alarm, various conventional methods for determining the presence or absence of the flame based on flame fluctuation are used.

In a conventional fire detector and a conventional fire detecting method (for example, see JP 2002-162296 A (first page and FIG. 1)), a detection output from a detection sensor for receiving light energy and converting the light energy into an electrical signal is subjected to frequency analysis using a fast Fourier transform method. A pattern of an obtained frequency spectrum distribution is examined and compared with a spectral component of a flame in a center frequency band thereof, a spectral component of a rotating lamp in a frequency band thereof, and a spectral component of another object in a low frequency band thereof. When the spectral pattern of the flame is detected, the occurrence of the fire resulting from the flame is determined.

When the presence or absence of the flame of the fire is to be determined, various conventional methods are used to obtain infrared rays of at least two wavelength bands, of infrared rays emitted from the flame, in relation to a $CO_2$ resonance band or the like and eliminate an infrared ray from a high-temperature object based on a ratio between the obtained infrared rays.

In a conventional infrared ray flame detector (for example, see JP2000-356547 A (first page and FIG. 1)), an infrared ray of a wavelength specific to fire and an infrared ray of a wavelength close thereto are detected. The occurrence or nonoccurrence of the fire resulting from the flame is determined based on a ratio between energy quantities of the detected two infrared rays.

In the conventional fire detector and the conventional fire detecting method, in order to determine the presence or absence of the flame based on flame fluctuation, it is necessary to produce the pattern of the frequency spectrum distribution. In addition, it is necessary to process the detection output from the detection sensor using the fast Fourier transform method and distinguish the detection output from a transient output. Therefore, there is a problem in that processing is complicated to take a time and a trouble and lack the reliability of fire determination.

In the conventional infrared ray flame detector, the infrared ray of the wavelength specific to the fire and the infrared ray of the wavelength close thereto are detected and the occurrence or nonoccurrence of the fire resulting from the flame is determined based on the ratio between the energy quantities of the detected two infrared rays. However, the fluctuation of a ratio between outputs produced by an actual flame is not constant but varies. Therefore, there is a problem in that the occurrence or nonoccurrence of the fire resulting from the flame cannot be reliably detected based on only the fact that an output ratio between the two infrared rays is within a predetermined range.

SUMMARY OF THE INVENTION

The present invention has been made to solve the above-mentioned problems. An object of the present invention is to provide a flame detector capable of detecting a waveform from a detection signal from an infrared sensor and simply and reliably determining the presence or absence of a flame of fire based on the detected waveform.

Another object of the present invention is to provide a flame detector capable of reliably detecting the presence or absence of a flame of fire based on actual flame fluctuation in view of the fact that an output ratio between two infrared rays varies and the output ratio between the two infrared rays is in a predetermined distribution state.

Another object of the present invention is to provide a flame detector for reliably determining the presence of a flame of fire in view of the fact that data related to a detected pulse waveform is in a predetermined distribution state because actual flame fluctuation is not constant.

According to an aspect of the present invention, a flame detector includes an infrared sensor for detecting an infrared ray, waveform storing means for storing a plurality of waveforms detected from an output signal from the infrared sensor, and waveform count determining means for determining that the waveforms are successively obtained when at least a first predetermined number of waveforms stored in the waveform storing means are produced for a first predetermined time and at least a second predetermined number of waveforms different from the first predetermined number of waveforms are produced for a second predetermined time different from the first predetermined time.

According to another aspect of the present invention, a flame detector includes an infrared sensor for detecting an infrared ray, waveform detecting means for detecting waveforms from an output signal from the infrared sensor, and waveform interval determining means for recognizing a time when a first waveform is to be detected by the waveform detecting means as a start point, successively detecting waveforms in a case where an interval between a time when detection of the first waveform starts and a time when a next waveform is detected is within a third predetermined time interval, and determining that the waveforms are successively obtained when a fourth predetermined time elapses from the start point.

According to another aspect of the present invention, a flame detector includes a main infrared sensor for detecting an infrared ray including a specific wavelength band which is emitted from a flame a sub infrared sensor for detecting an infrared ray including a wavelength band different from the specific wavelength band of the infrared ray detected by the main infrared sensor, calculating means for calculating an output ratio between detection signals from the main infrared sensor and the sub infrared sensor, and flame determining means for determining a presence of the flame based on that the output ratio calculated by the calculating means is in a predetermined distribution state.

According to another aspect of the present invention, a flame detector includes an infrared sensor for detecting an infrared ray including a specific wavelength band which is emitted from a flame, waveform data acquiring means for capturing a detection signal from the infrared sensor to obtain a plurality of pulse waveform data items therefrom, and flame determining means for determining a presence of the flame based on that the plurality of pulse waveform data items obtained by the waveform data acquiring means are in a predetermined distribution state.

As described above, according to the present invention, the waveform count determining means determines that at least the first predetermined number of pulse waveforms which are stored in the waveform storing means and obtained from the detection signal from the infrared sensor are produced for the first predetermined time and determines that at least the second predetermined number of pulse waveforms which are stored in the waveform storing means and obtained from the detection signal from the infrared sensor are produced for the second predetermined time, thereby determining that the pulse waveforms detected by the infrared sensor are successively obtained. Therefore, unlike a conventional case, it is unnecessary to determine a waveform width based on flame fluctuation or produce a frequency distribution. Thus, it is possible to simply and reliably obtain a pulse waveform distribution resulting from the flame through simple processing of counting the number of pulse waveforms produced for the predetermined time based on the waveforms stored in the waveform storing means.

The waveform interval determining means recognizes a time when a first pulse waveform obtained from the output signal from the infrared sensor is detected by the waveform detecting means as a start point, successively detects pulse waveforms in the case where an interval between a time when the detection of the first pulse waveform starts and a time when a next pulse waveform is detected is within the third predetermined time interval, and determines that the pulse waveforms detected by the infrared sensor are successively obtained when the fourth predetermined time elapses from the start point. Therefore, unlike a conventional case, it is unnecessary to determine the waveform width based on flame fluctuation or produce the frequency distribution. Thus, it is possible to simply and reliably determine that the pulse waveforms resulting from the flame are successively obtained through simple processing of determining whether or not a state in which the pulse waveforms are successively detected continues for a predetermined time.

For example, a heat source which suddenly comes into view generates very large energy. However, when the determination that the pulse waveforms are successively obtained as described above is made, the large energy can be eliminated as transient energy. Even in the case of application of shock, large energy is generated. However, the energy caused by such a transient false alarm factor can be eliminated based on the above-mentioned determination.

The calculating means calculates the output ratio between the detection signals from the main infrared sensor and the sub infrared sensor. The flame determining means determines the presence of the flame based on the fact that the output ratio between the detection signals from both the infrared sensors which is calculated by the calculating means is in a predetermined distribution state. Therefore, the presence or absence of the flame can be determined based on the distribution state of the output ratio which corresponds to actual flame fluctuation, so that it is possible to reliably determine the presence of the flame.

The waveform data acquiring means captures the detection signals from the infrared sensors to obtain a plurality of pulse waveform data items therefrom. The flame determining means determines the presence of the flame based on the fact that the plurality of pulse waveform data items are in the predetermined distribution state. Therefore, even when the actual flame fluctuation is not constant, the presence or absence of the flame can be determined based on the distribution of pulse waveform data which corresponds to the fluctuation. Thus, it is possible to reliably determine the presence of the flame.

DETAILED DESCRIPTION OF THE PREFERRED EMBODIMENT

Figure 1:
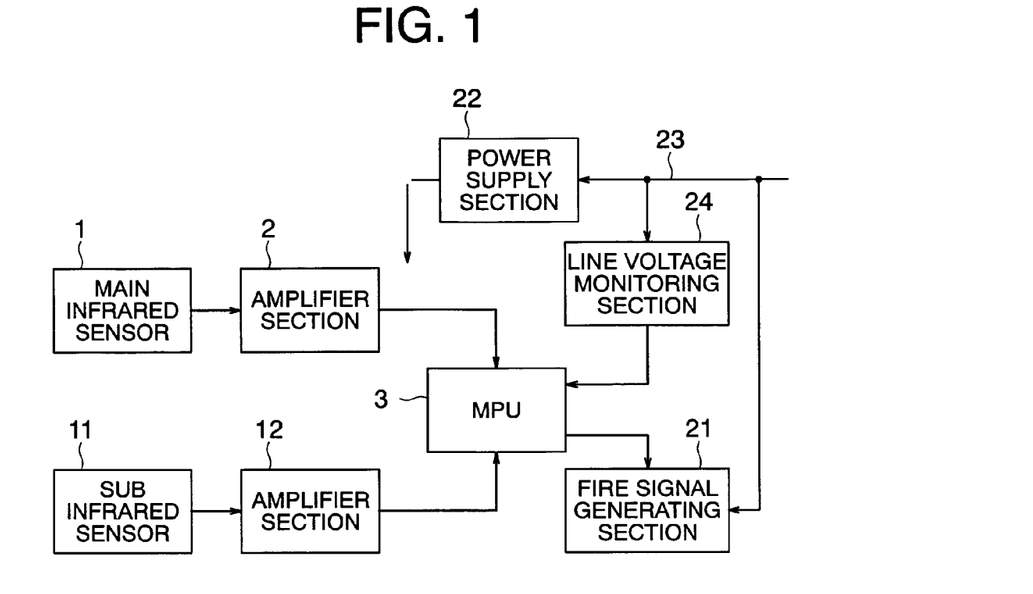
FIG. 1 is a block diagram showing a structure of a flame detector according to an embodiment of the present invention.
Figure 2:
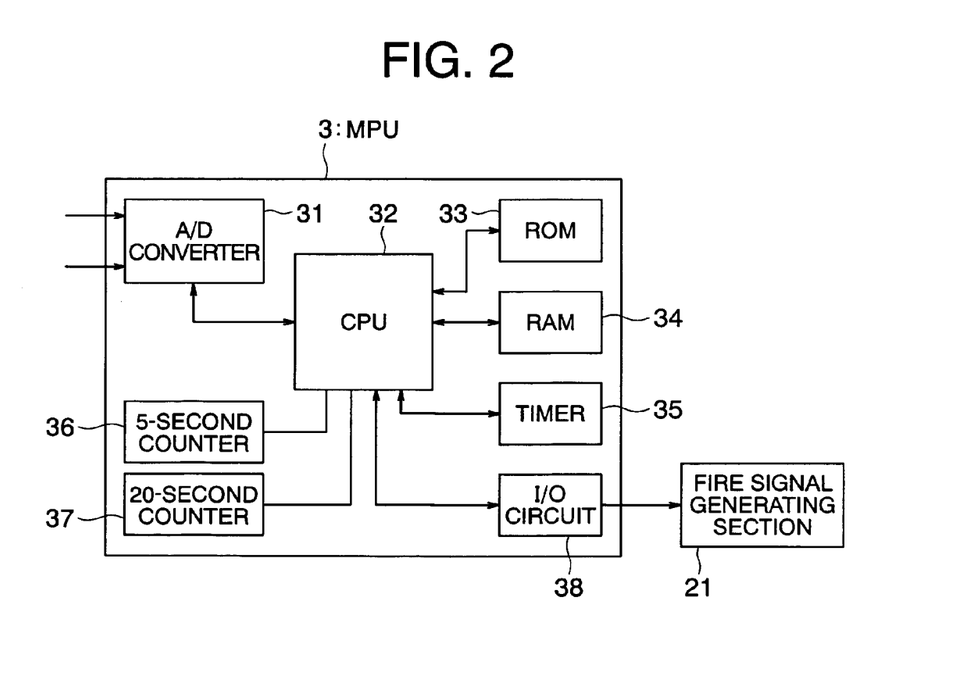
FIG. 2 is a block diagram showing an internal structure of an MPU of the flame detector.
Figure 3:
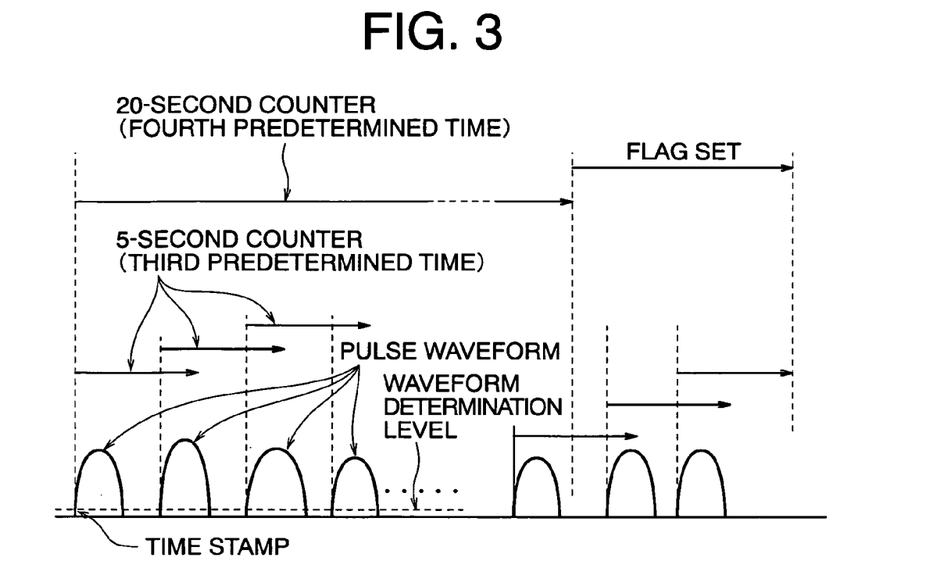
FIG. 3 is an explanatory diagram showing waveform processing performed when waveforms are successively detected from an output signal from an infrared sensor of the flame detector, which is captured by the MPU.
Figure 4:
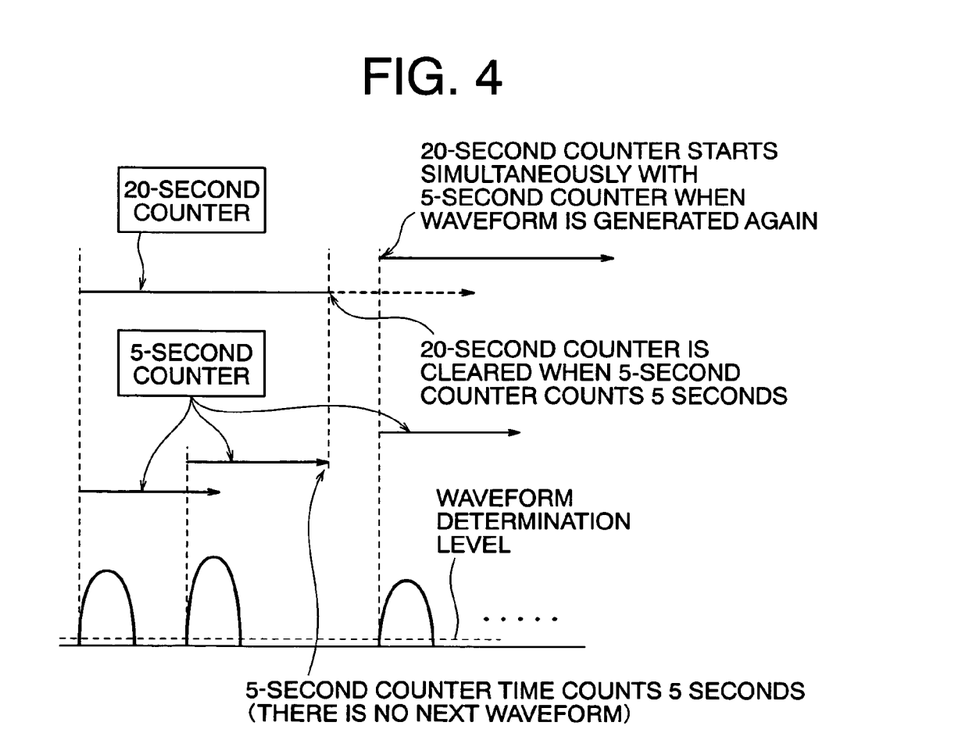
FIG. 4 is an explanatory diagram showing waveform processing performed when waveforms are not successively detected from an output signal from the infrared sensor of the flame detector, which is captured by the MPU.
Figure 5:
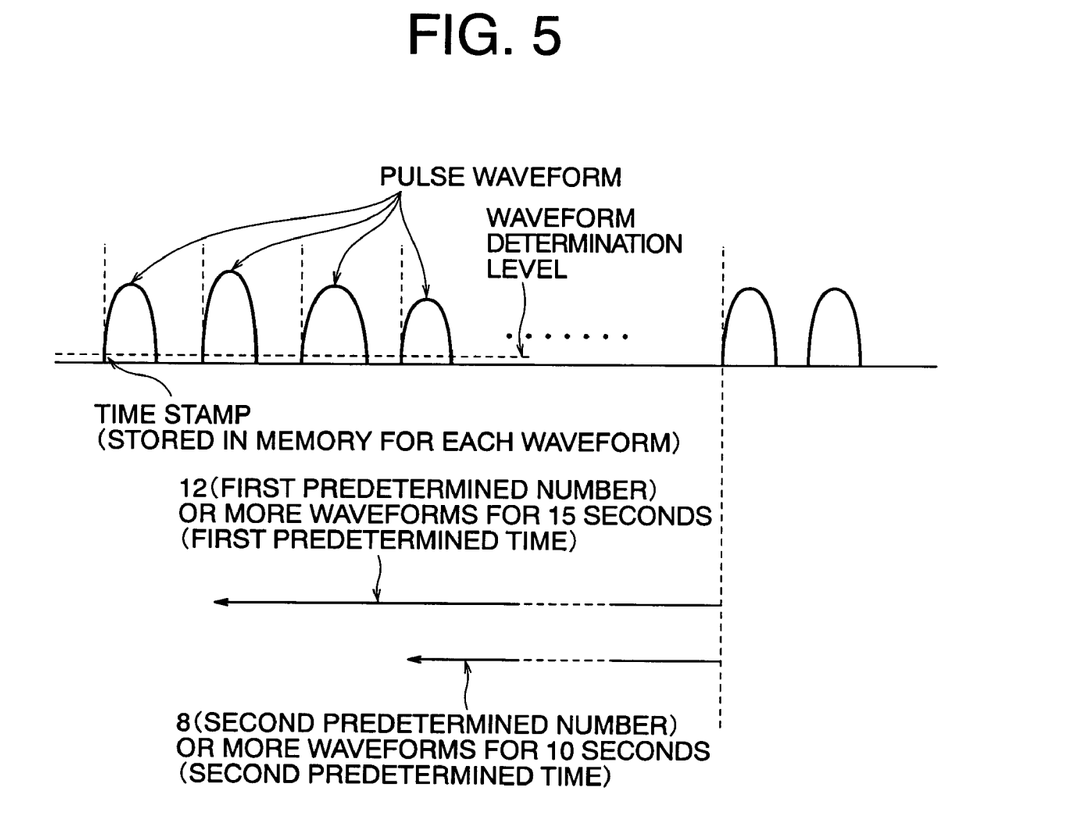
FIG. 5 is an explanatory diagram showing waveform count determination processing performed when the waveforms are successively detected from the output signal from the infrared sensor of the flame detector, which is captured by the MPU.
Figure 6:
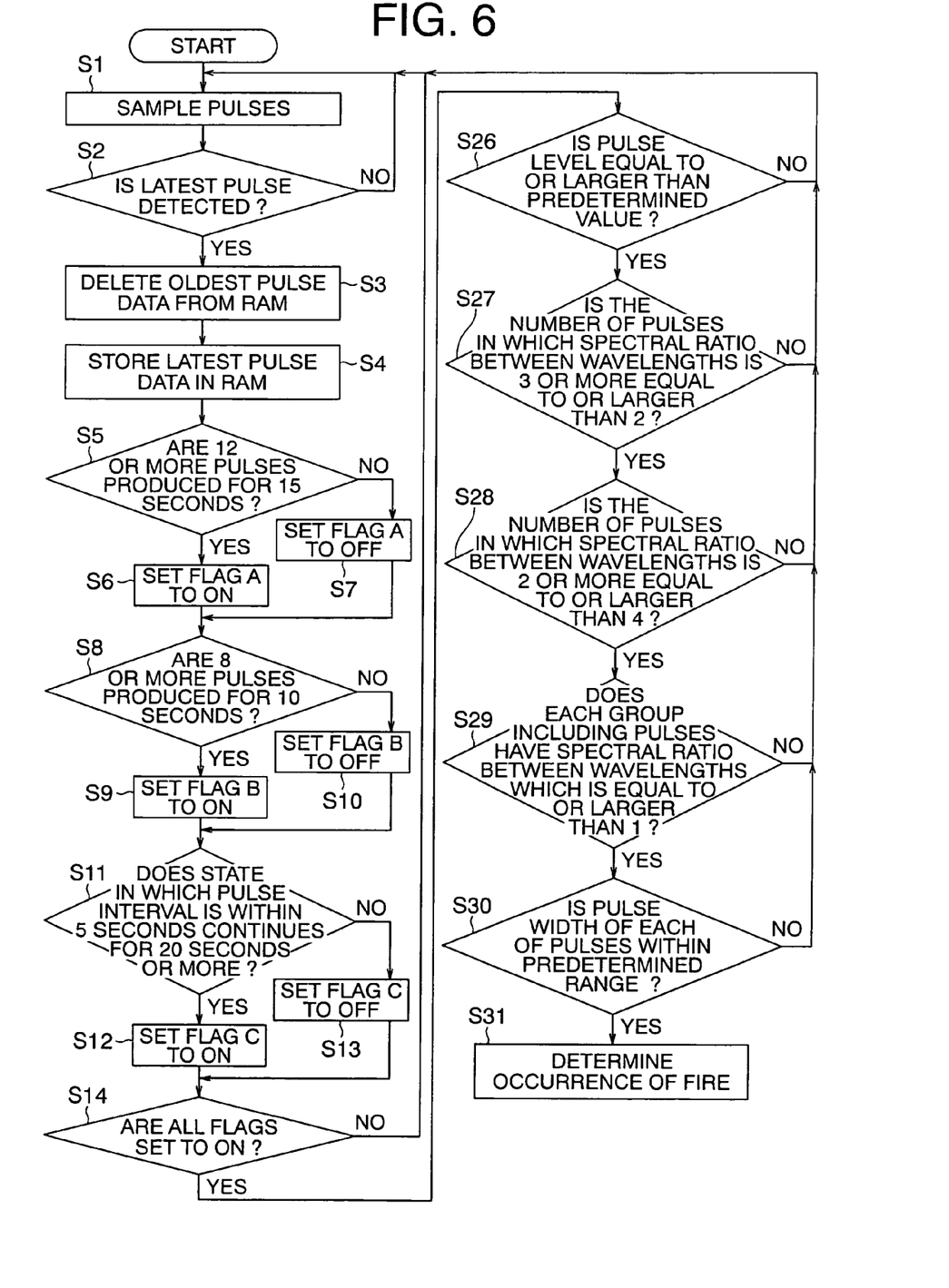
FIG. 6 is a flow chart showing an operation of the flame detector.
Figure 7:
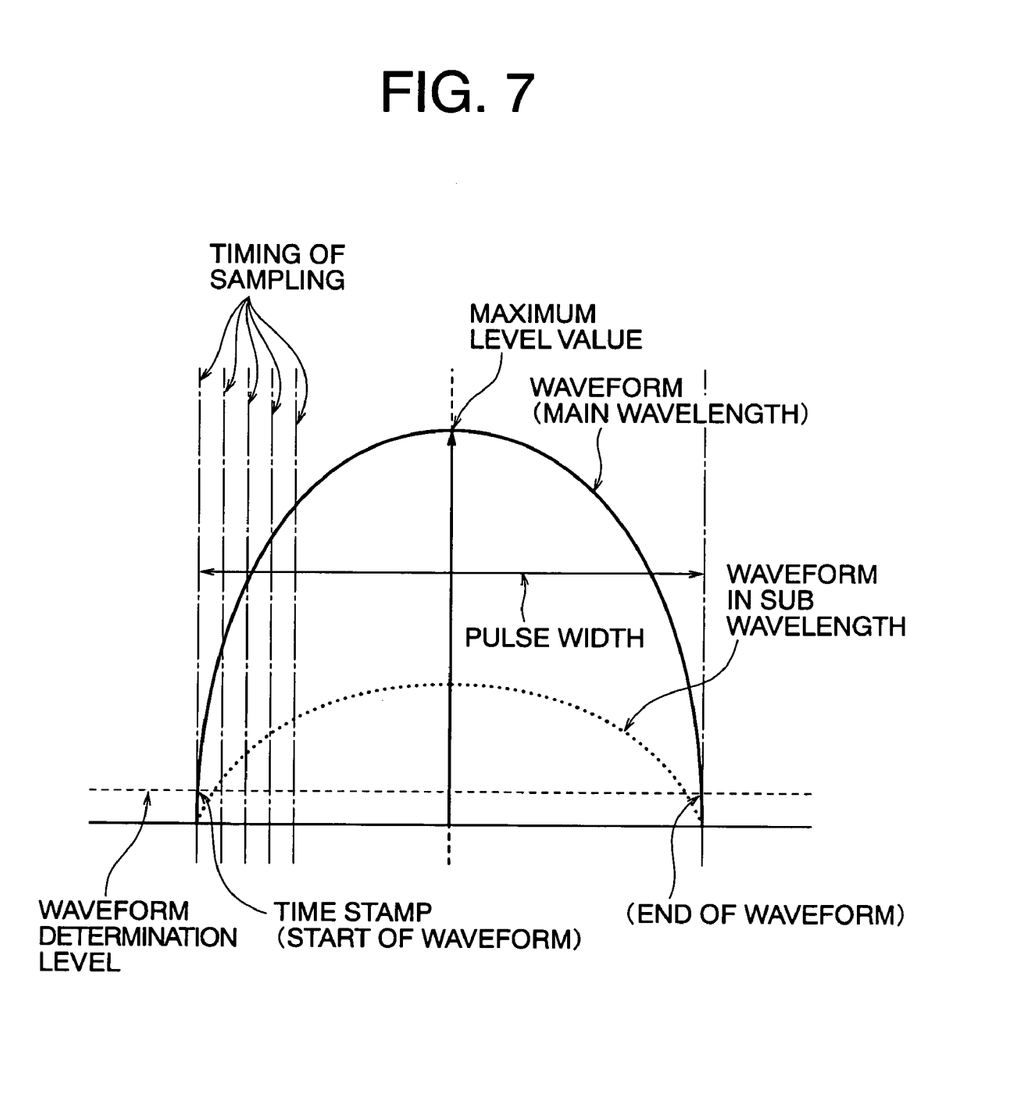
FIG. 7 is an explanatory diagram showing a type of pulse waveform data obtained when an output signal from the infrared sensor of the flame detector is captured by the MPU.
Figure 8:
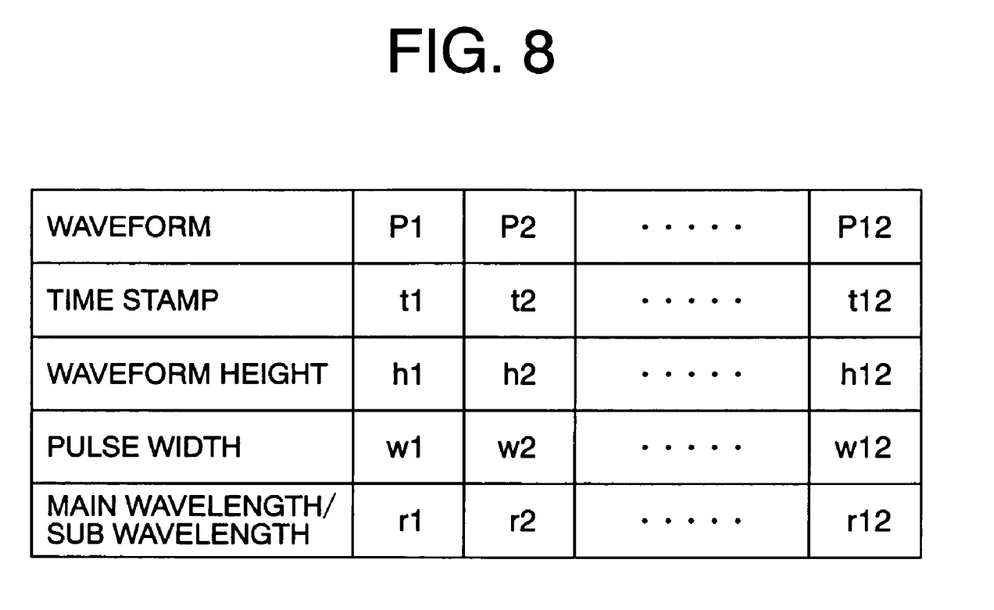
FIG. 8 is a table showing various pulse waveform data obtained when an output signal from the infrared sensor of the flame detector is captured by the MPU.

FIG. 1 is a block diagram showing a structure of a flame detector according to an embodiment of the present invention. FIG. 2 is a block diagram showing an internal structure of an MPU of the flame detector. FIG. 3 is an explanatory diagram showing waveform processing performed when waveforms are successively detected from an output signal from an infrared sensor of the flame detector, which is captured by the MPU. FIG. 4 is an explanatory diagram showing waveform processing performed when waveforms are not successively detected from an output signal from the infrared sensor of the flame detector, which is captured by the MPU. FIG. 5 is an explanatory diagram showing waveform count determination processing performed when waveforms are successively detected from an output signal from the infrared sensor of the flame detector, which is captured by the MPU. FIG. 6 is a flow chart showing an operation of the flame detector. FIG. 7 is an explanatory diagram showing a type of pulse waveform data obtained when an output signal from the infrared sensor of the flame detector is captured by the MPU. FIG. 8 is a table showing various pulse waveform data obtained when an output signal from the infrared sensor of the flame detector is captured by the MPU.

The flame detector shown in FIG. 1 includes a main infrared sensor 1 having a pyroelectric element in which a pyroelectric member, a high resistor, and a FET are incorporated. The main infrared sensor 1 receives an infrared ray related to $CO_2$ resonance radiation in order to detect a flame. Then, the main infrared sensor 1 converts the infrared ray into an electrical signal and outputs the electrical signal to an amplifier section 2. A signal amplified by the amplifier section 2 is inputted to an MPU 3.

The flame detector further includes a sub infrared sensor 11 having the same structure as that of the main infrared sensor 1. The sub infrared sensor 11 receives an infrared ray having a wavelength band different from that of the infrared ray received by the main infrared sensor 1. Then, the sub infrared sensor 11 converts the infrared ray into an electrical signal and outputs the electrical signal to an amplifier section 12. A signal amplified by the amplifier section 12 is inputted to the MPU 3.

A point different from the main infrared sensor 1 is that the sub infrared sensor 11 outputs a signal in which a wavelength of the infrared ray detected by the pyroelectric member is within a wavelength band (for example, 5.0 μm) which is slightly shifted from a wavelength band of a $CO_2$ resonance radiation.

As shown in FIG. 2, the MPU 3 includes an A/D converter 31, a CPU 32, a ROM 33 for storing pulse waveform data, a RAM 34, a timer 35, a 5-second counter 36, a 20-second counter 37, and an I/O (input and output) circuit 38. The CPU 32 captures an output from the amplifier section 2 through the A/D converter 31 and determines whether or not waveforms are successively detected and whether or not waveforms exhibit a flame as described later. A sampling interval for capturing the output through the A/D converter 31 is set by the timer 35 of the MPU 3.

The MPU 3 is connected with a fire signal generating section 21 through the I/O circuit 38. When the MPU 3 determines that the waveforms exhibit the flame, the fire signal generating section 21 outputs a fire signal in response to a detection signal from the MPU 3. The fire signal section 21 is connected with a fire receiver (not shown). A power supply section 22 supplies a power supply voltage to each part. A power supply and signal line 23 is provided to supply a predetermined direct current voltage to the power supply section 22. A line voltage monitoring section 24 for monitoring a state of the power supply voltage is provided for power supply section 22 and the power supply and signal line 23. When a fire occurs, the line voltage monitoring section 24 checks whether or not a line voltage on the power supply and signal line 23 is abnormal. When the line voltage is not abnormal, the line voltage monitoring section 24 causes the MPU 3 to output the detection signal.

Next, an operation of the flame detector according to the embodiment of the present invention will be described with reference to the flow chart shown in FIG. 6.

In summary, according to the flow chart shown in FIG. 6, sampling processing is performed to capture the outputs from the infrared sensors 1 and 11 as detection levels through the A/D converter 31 at predetermined intervals. Waveforms resulting from flame fluctuation are detected based on the detection level continuously obtained from the main infrared sensor 1 to produce respective waveform data. The waveform data are stored in the RAM 34. The presence or absence of the flame is determined based on the detected waveforms. At this time, two determinations, that is, the determination whether or not the waveforms are successively obtained and the determination whether or not the waveforms exhibit the property of the flame are made. When the presence of the flame is determined based on results obtained by the determinations, the fire signal is generated.

In FIG. 6, sensor outputs from the main infrared sensor 1 and the sub infrared sensor 11 are amplified by the amplifier sections 2 and 12 and then inputted to the MPU 3.

When a sampling time set in the timer 35 comes, the CPU 32 of the MPU 3 samples the detection signals from the main infrared sensor 1 and the sub infrared sensor 11, which are subjected to the A/D conversion by the A/D converter 31, in a predetermined cycle of, for example, 50 ms (Step S1).

Then, a latest pulse waveform based on the flame fluctuation is detected from the sampled detection signal of the main infrared sensor 1 (Step S2).

With respect to the detection of the pulse waveform, a time when a detection level of a detection signal captured by sampling exceeds a predetermined waveform determination level is assumed as a start point of a waveform. Then, a time when the detection level becomes lower than the predetermined waveform determination level is assumed as an end point of the waveform, thereby obtaining a single waveform. The start point (start time) of the waveform is stored as a time stamp in the RAM 34 serving as a memory. After that, waveform data necessary for each single waveform is produced. The time stamp is used to check whether or not subsequent waveforms are successively produced.

Note that, as shown in FIG. 7, the waveform data includes a time stamp corresponding to a start point of a waveform of a main wavelength, a height (maximum level value) of the waveform of the main wavelength, an area ratio between the waveform of the main wavelength and a waveform of a sub wavelength, and a pulse width of the waveform of the main wavelength. The waveform data is stored for each of the waveforms.

The height of the waveform of the main wavelength is obtained as follows. That is, after the waveform of the main wavelength appears, while a detection level thereof which is detected at each sampling point rises, when the risen detection level thereof falls, a latest risen detection level is detected as a maximum level value. The maximum level value is stored as the height of the waveform of the main wavelength in the RAM 34.

The area ratio between the waveform of the main wavelength and the waveform of the sub wavelength is obtained as follows. That is, the integral of the waveform of the main wavelength is calculated between a point immediately after the detection level thereof exceeds the waveform determination level and a point immediately before the detection level thereof which falls after the rising becomes lower than the waveform determination level. Simultaneously, the integral of the waveform of the sub wavelength is calculated. The ratio between those integral values are calculated as the area ratio between the waveform of the main wavelength and the waveform of the sub wavelength and stored in the RAM 34. The area ratio between the waveform of the main wavelength and the waveform of the sub wavelength corresponds to a spectral ratio between the main wavelength and the sub wavelength.

The pulse width of the waveform of the main wavelength is obtained as follows. That is, it is determined that the time when the detection level becomes lower than the waveform detection level is the end point of the waveform. A period between the time stamp and the end point is expressed by a time corresponding the number of samplings and stored as the pulse width in the RAM 34.

As shown in the table of FIG. 8, while the waveform is being detected as described above, 12 waveform data items, each of which includes the time stamp, the height (maximum level value) of the waveform, the area ratio (spectral ratio) between the waveform of the main wavelength and the waveform of the sub wavelength, and the pulse width of the waveform of the main wavelength, are stored. When a thirteenth pulse, which is a latest pulse, is produced, oldest waveform data is cleared. Therefore, 12 waveform data items are usually stored.

When the waveform of the latest pulse is detected, the CPU 32 deletes the waveform data of an oldest pulse from the RAM 34 (Step S3).

After that, the CPU 32 stores the waveform data of the latest pulse in the RAM 34 (Step S4).

Although the waveform data of the latest pulse is sequentially stored in the RAM 34, the time stamp corresponding to the start point of the waveform is also stored in the RAM 34. Simultaneously, the CPU 32 activates the 5-second (third predetermined time) counter 36 and the 20-second (fourth predetermined time) counter 37 as described later.

On the other hand, as shown in FIG. 5, the number of pulse waveforms is determined as follows. That is, with respect to a method of determining whether or not the waveforms are successively obtained, the CPU 32 reads out the waveforms stored in the RAM 34 and determines whether or not 12 (first predetermined number) or more waveforms are produced for 15 seconds (first predetermined time) before the time of determination (Step S5). When the 12 or more waveforms are produced, a flag A is set to ON (Step S6). When 12 or more waveforms are not produced, the flag A is set to OFF (Step S7).

Then, as in the above-mentioned manner, the CPU 32 reads out the waveforms stored in the RAM 34 and determines whether or not 8 (second predetermined number) or more waveforms are produced for 10 seconds (second predetermined time) before the time of determination (Step S8). When the 8 or more waveforms are produced, a flag B is set to ON (Step S9). When 8 or more waveforms are not produced, the flag B is set to OFF (Step S10).

As described above, because a predetermined number of waveforms are included for each of the two different times, it is possible to simply determine that a plurality of pulse waveforms to be obtained are distributed.

Next, another method of determining whether or not the waveforms are successively obtained is as follows. The CPU 32 determines whether or not a state in which the pulse waveforms are successively obtained and the pulse interval therebetween is within 5 seconds continues for 20 seconds or more (Step S11). When such a state continues, a flag C is set to ON (Step S12). When the state does not continue, the flag C is set to OFF (Step S13).

This determination method will be described in detail. As shown in FIG. 3, when a period between the start time of a first pulse waveform to be detected and the start time of a next pulse waveform to be detected is within 5 seconds, the 5-second counter 36 is reset and the 20-second counter 37 continues. Every time the pulse waveform is detected, corresponding waveform data is stored in the RAM 34.

After the reset state of the 5-second counter 36 continues and the 20-second counter 37 counts 20 seconds, a flag is set to indicate that this 20-second continuous condition is satisfied. The flag is being set while the 5-second counter 36 is reset. When the 5-second counter 36 counts 5 seconds, the flag is cleared.

As shown in FIG. 4, when the next pulse waveform is not detected and the 5-second counter 36 counts 5 seconds, the 20-second counter 37 is cleared.

After that, a pulse waveform is detected, and processing returns to "START". As in Step S4, the 5-second counter 36 and the 20-second counter 37 are activated.

As described above, every time the pulse waveform is detected, the 5-second counter 36 is reset. When the 20-second counter 37 counts 20 seconds, the flag is set again.

When all of the flags A, B, and C are set to ON, the CPU 32 serving as waveform determining means determines that the waveforms are successively obtained. Then, processing goes to a next stage of determining whether or not the waveform exhibits the property of a flame.

As described above, when the state in which the pulse interval is within 5 seconds continues for 20 seconds or more, the 12 or more waveforms are produced for 15 seconds, and the 8 or more waveforms are produced for 10 seconds, it is possible to recognize the continuation of the flame and eliminate a transient phenomenon.

The determination whether or not the waveforms are successively obtained is made based on the detection signal from a single sensor, that is, the main infrared sensor 1. However, the determination whether or not the waveform exhibits the property of the flame, which is the next stage, is made based on the detection signals from the main infrared sensor 1 and the sub infrared sensor 11.

The reason why the presence or absence of the flame is determined based on the detection signals from the main infrared sensor 1 and the sub infrared sensor 11 is as follows. That is, so-called black-body radiation emitted from an object has a continuous spectra 1 distribution. On the other hand, the infrared ray emitted from the flame has a spectral distribution in which an intensity of the infrared ray becomes large at a specific wavelength (for example 4.4 µm) by so-called $CO_2$ resonance radiation. As a result, these spectral distributions are different from each other. Therefore, an infrared ray of a peak wavelength which is emitted from the flame of fire is detected by the main infrared sensor 1 and a heat radiation having a wavelength shifted from the peak wavelength is detected by the sub infrared sensor 11. In the case of fire, a ratio between both the sensor outputs, that is, a spectral ratio between the wavelengths becomes, for example, 3:1.

The spectral ratio between the wavelengths is calculated from the area ratio between the waveform of the main wavelength and the waveform of the sub wavelength.

Actual flame fluctuation is not constant, so the height of the waveform of the main wavelength, the area ratio (spectral ratio) between the waveform of the main wavelength and the waveform of the sub wavelength, and the pulse width of the waveform of the main wavelength vary. Therefore, whether or not the pulse waveform exhibits the property of the flame is determined based on the degree of variation in each of the height, the area ratio, and the pulse width.

(1) A variation in height of the waveform of the main wavelength will be described.

The waveform data related to each waveform, including the maximum level value of the waveform of the main wavelength, of sampling outputs, which is the height of the waveform of the main wavelength, is stored in the RAM 34. When each of the 12 waveform data stored in the RAM 34 includes a height equal to or larger than a predetermined level and at least one waveform data include a height in which a ratio thereof to the maximum level value is 0.8 or less, the CPU 32 determines the presence of the flame (Step S26).

(2) A variation in area ratio (spectral ratio) between the waveform of the main wavelength and the waveform of the sub wavelength will be described.

First, it is checked whether or not the number of pulses in which the area ratio between a pulse of a wavelength which is obtained by the main infrared sensor 1 and a pulse of a wavelength which is obtained by the sub infrared sensor 11, that is, the spectral ratio between the wavelengths is 3 or more is equal to or larger than 2 (Step S27). Next, it is checked whether or not the number of pulses in which the spectral ratio between the wavelengths is 2 or more is equal to or larger than 4 (Step S28). Finally, it is checked whether or not each group including pulses has a spectral ratio between the wavelengths which is equal to or larger than 1 (Step S29). When the number of pulses in which the spectral ratio between the wavelengths is 3 or more is equal to or larger than 2, the number of pulses in which the spectral ratio between the wavelengths is 2 or more is equal to or larger than 4, and each group including pulses has a spectral ratio between the wavelengths which is equal to or larger than 1, the CPU 32 serving as flame determining means determines the occurrence of the fire resulting from the flame.

(3) A variation in pulse width of the waveform of the main wavelength will be described.

The waveform data related to each waveform, including a calculated pulse width corresponding to a period between a time when a sampling output exceeds the waveform determination level and a time when the sampling output becomes lower than the waveform determination level, is stored in the RAM 34.

When a pulse width of each of the 12 waveform data items stored in the RAM 34 is within a predetermined range, and a pulse width of each of at least three of the 12 waveform data items is within a long division range of division ranges defined by dividing the predetermined range into three ranges, and a pulse width of each of at least three other of the 12 waveform data items is within a short division range of the division ranges, the presence of the flame is determined because the pulse width of each of the pulses is within the predetermined range (Step S30).

As described above, when the presence of the flame is determined in each of the flame determination performed based on the pulse level in Step S26, the flame determination performed based on the spectral ratio between the wavelengths in Steps S27 to S29, and the determination related to the property of the flame which is performed based on the pulse width in Step S30, the occurrence of the fire resulting from the flame is determined (Step S31).

When the occurrence of the fire resulting from the flame is determined, the MPU 3 performs the detection output to the fire signal generating section 21. The fire signal generating section 21 outputs the fire signal to the fire receiver through the power supply and signal line 23.

According to this embodiment, the CPU 32 serving as the waveform count determining means determines that the 12 (first predetermined number) or more pulse waveforms which are stored in the RAM 34 serving as the waveform storing means and obtained from the detection signal from the main infrared sensor 1 are produced for the first predetermined time of 15 seconds, and determines that the 8 (second predetermined number) or more pulse waveforms which are stored in the RAM 34 serving as waveform storing means and obtained from the detection signals from the main infrared sensor 1 are produced for the second predetermined time of 10 seconds, thereby determining that the pulse waveforms detected by the main infrared sensor 1 are successively obtained. Therefore, unlike a conventional case, it is unnecessary to determine a waveform width based on flame fluctuation or produce a frequency distribution. Thus, it is possible to simply and reliably obtain a pulse waveform distribution resulting from the flame through simple processing of counting the number of pulse waveforms produced for the predetermined time based on the waveforms stored in the RAM 34 serving as the waveform storing means.

For example, a heat source which suddenly comes into view generates very large energy. However, when the determination that the pulse waveforms are successively obtained as described above is made, the large energy can be eliminated as transient energy. Even in the case of application of shock, large energy is generated. However, the energy caused by such a transient false alarm factor can be eliminated based on the above-mentioned determination.

The CPU 32 serving as the waveform count determining means recognizes, as a single waveform, a change of the output signal from the main infrared sensor 1 which is caused between a start time when the level of the output signal exceeds the waveform detection level set to obtain a fluctuation waveform and a time when the level thereof becomes lower than the waveform detection level. Then, the CPU 32 stores the single waveform in the RAM 34 serving as the waveform storing means. Therefore, when the determination of the flame fluctuation is to be made, the waveform detection level for starting the recognition of the pulse waveform is set to a low level. Thus, even when the detection output is small, the presence or absence of the flame can be determined, so that the early determination of the flame and the improvement of sensitivity can be achieved.

The CPU 32 serving as the waveform detecting means and the waveform interval determining means recognizes a time when the detection of a first waveform starts as a start point and successively detects waveforms in the case where an interval between the time when the detection of the first waveform starts and a time when a next waveform is detected is within the third predetermined time interval measured by the 5-second counter 36. Then, the CPU 32 determines that the waveforms are successively obtained when the fourth predetermined time measured by the 20-second counter 37 elapses from the start point. After that, the CPU 32 deletes the start point in the case where the interval between the time when the detection of the first waveform starts and the time when the next waveform is detected exceeds the third predetermined time interval. Therefore, when the CPU 32 counts the number of pulse waveforms, the CPU 32 can determine that the waveforms are successively obtained at the third predetermined time interval. In addition, when the number of waveforms is counted for the fourth predetermined time while the succession of the waveforms is checked, the CPU 32 can simply and reliably determine that the waveforms are produced based on an output from the flame.

The CPU 32 serving as the waveform detecting means recognizes, as the single waveform, a change of the output signal from the main infrared sensor 1 which is caused between the start time when the level of the output signal exceeds the waveform detection level set to obtain the fluctuation waveform and the time when the level thereof becomes lower than the waveform detection level, and then detects each waveform. Therefore, in the case where the waveform detection level for starting the recognition of the pulse waveform is set to a low level, even when the detection output is small, the presence or absence of the flame can be determined, so that the early determination of the flame and the improvement of sensitivity can be achieved.

The CPU 32 serving as the flame determining means determines the occurrence or nonoccurrence of the fire resulting from the flame based on the spectral ratio between the wavelength of the pulse obtained by the main infrared sensor 1 and the wavelength of the pulse obtained by the sub infrared sensor 11. Therefore, after the determination that the pulse waveforms are successively obtained is made, the occurrence of the fire resulting from the flame can be reliably determined.

The CPU 32 serving as the flame determining means determines the occurrence of the fire resulting from the flame when the number of pulses in which the spectral ratio between the wavelength of the pulse which is obtained by the main infrared sensor 1 and the wavelength of the pulse which is obtained by the sub infrared sensor 11 is 3 or more is equal to or larger than 2 and when each group including pulses has a spectral ratio between the wavelengths which is equal to or larger than 1. Therefore, because there are at least two determination stages, the occurrence of the fire resulting from the flame can be further reliably determined.

In this embodiment, the CPU 32 serving as the calculating means and the flame determining means calculates the output ratio between the detection signals from the main infrared sensor 1 and the sub infrared sensor 11 for each group including a plurality of pulses and determines the presence of the flame based on the fact that the output ratio for each group including the plurality of pulses is in a predetermined distribution state. Therefore, the presence or absence of the flame can be determined based on the distribution state of the output ratio which corresponds to actual flame fluctuation, so that it is possible to reliably determine the presence of the flame.

The CPU 32 compares a group including a plurality of spectral ratios, each of which is a ratio between the wavelengths of the pulses which are obtained by both the infrared sensors, with a group including a plurality of threshold values and obtains that the spectral ratio between the wavelengths is in the predetermined distribution state. Therefore, even when the actual flame fluctuation is not constant, the determination of the fluctuation is made, so that the presence or absence of the flame can be further reliably determined.

In this embodiment, the CPU 32 serving as the waveform data acquiring means and the flame determining means captures the detection signals from the infrared sensors to obtain a plurality of pulse waveform data items therefrom and determines the presence or absence of the flame based on the distribution of the plurality of pulse waveform data items. Therefore, even when the actual flame fluctuation is not constant, the presence or absence of the flame can be determined based on the distribution of pulse waveform data items which corresponds to the fluctuation. Thus, it is possible to reliably determine the presence of the flame.

The pulse waveform data item includes the height of the pulse waveform and the pulse width thereof and may include other parameters.

The CPU 32 compares the height of each pulse waveform and the pulse width thereof with corresponding predetermined threshold values to make the determination of each distribution, so the determination of the actual flame fluctuation is made from various viewpoints. Therefore, the presence or absence of the flame can be further reliably determined.

What is claimed is:

1. A flame detector, comprising:
    an infrared sensor for detecting an infrared ray;
    waveform storing means for storing a plurality of waveforms detected from an output signal from the infrared sensor; and
    waveform count determining means for determining that the waveforms are successively obtained when at least a first predetermined number of waveforms stored in the waveform storing means are produced for a first predetermined time and at least a second predetermined number of waveforms different from the first predetermined number of waveforms are produced for a second predetermined time different from the first predetermined time.

2. The flame detector according to claim 1, wherein the waveform count determining means is operable to recognize, as a single waveform, a change of the output signal from the infrared sensor which is caused between a start time when the level of the output signal exceeds a waveform detection level set to obtain a fluctuation waveform and a time when the level thereof becomes lower than the waveform detection level and stores the single waveform in the waveform storing means.

3. A flame detector, comprising:
    an infrared sensor for detecting an infrared ray;
    waveform detecting means for detecting waveforms from an output signal from the infrared sensor; and
    waveform interval determining means for recognizing a time when a first waveform is to be detected by the waveform detecting means as a start point, successively detecting waveforms in a case where an interval between a time when detection of the first waveform starts and a time when a next waveform is detected is within a third predetermined time interval, and determining that the waveforms are successively obtained when a fourth predetermined time elapses from the start point.

4. The flame detector according to claim 3, wherein the waveform detecting means is operable to detect, as a start point of the first waveform, a time when a level of the output signal from the infrared sensor exceeds a wavelength detection level set to obtain a fluctuation waveform.

5. The flame detector according to claim 1,
    wherein the infrared sensor comprises:
    a main infrared sensor for detecting an infrared ray including a specific wavelength band which is emitted from a flame; and
    a sub infrared sensor for detecting an infrared ray including a wavelength band different from the specific wavelength band of the infrared ray detected by the main infrared sensor, and
    wherein the wavelength count determining means is operable to determine, after it is determined that the waveforms are successively obtained, an occurrence or non-occurrence of fire resulting from the flame based on a spectral ratio between a wavelength obtained from the main infrared sensor and a wavelength obtained from the sub infrared sensor.

6. A flame detector, comprising:
    a main infrared sensor for detecting an infrared ray including a specific wavelength band which is emitted from a flame;
    a sub infrared sensor for detecting an infrared ray including a wavelength band different from the specific wavelength band of the infrared ray detected by the main infrared sensor;
    calculating means for calculating an output ratio between a detection signal from the main infrared sensor and a detection signal from the sub infrared sensor; and
    flame determining means for determining a presence of the flame based on that a plurality of output ratios calculated by the calculating means corresponds to a predetermined distribution state in which a first quantity of output ratios in the plurality of output ratios each have a value greater than or equal to a first predetermined value, a second quantity of output ratios in the plurality of output ratios each have a value greater than or equal to a second predetermined value, and in which each output ratio in the plurality of output ratios has a value greater than or equal to a third predetermined value.

7. A flame detector, comprising:
an infrared sensor for detecting an infrared ray including a specific wavelength band which is emitted from a flame;
waveform data acquiring means for capturing a detection signal from the infrared sensor, and for assuming a time when a detection level of the detection signal exceeds a predetermined waveform determination level as a start point of a waveform and a time when the detection level becomes lower than the predetermined waveform determination level as an end point of the waveform so as to obtain a plurality of pulse waveform data items therefrom, the plurality of pulse waveform data items including at least one of a height and a width of each pulse waveform; and
flame determining means for determining a presence of the flame based on that the at least one of the height and the width of each pulse waveform included in the plurality of pulse waveform data items obtained by the waveform data acquiring means are in a predetermined distribution state.

8. The flame detector according to claim 7, wherein the flame determining means is operable to compare the at least one of the height and the width of each pulse waveform with at least one threshold value to determine each distribution.

9. The flame detector according to claim 2,
wherein the infrared sensor comprises:
a main infrared sensor for detecting an infrared ray including a specific wavelength band which is emitted from a flame; and
a sub infrared sensor for detecting an infrared ray including a wavelength band different from the specific wavelength band of the infrared ray detected by the main infrared sensor, and
wherein the wavelength number count determining means is operable to determine, after it is determined that the waveforms are successively obtained, an occurrence or nonoccurrence of fire resulting from the flame based on a spectral ratio between a wavelength obtained from the main infrared sensor and a wavelength obtained from the sub infrared sensor.

10. The flame detector according to claim 3,
wherein the infrared sensor comprises:
a main infrared sensor for detecting an infrared ray including a specific wavelength band which is emitted from a flame; and
a sub infrared sensor for detecting an infrared ray including a wavelength band different from the specific wavelength band of the infrared ray detected by the main infrared sensor, and
wherein the wavelength interval determining means is operable to determine, after it is determined that the waveforms are successively obtained, an occurrence or nonoccurrence of fire resulting from the flame based on a spectral ratio between a wavelength obtained from the main infrared sensor and a wavelength obtained from the sub infrared sensor.

11. The flame detector according to claim 4,
wherein the infrared sensor comprises:
a main infrared sensor for detecting an infrared ray including a specific wavelength band which is emitted from a flame; and
a sub infrared sensor for detecting an infrared ray including a wavelength band different from the specific wavelength band of the infrared ray detected by the main infrared sensor, and
wherein the wavelength interval determining means is operable to determine, after it is determined that the waveforms are successively obtained, an occurrence or nonoccurrence of fire resulting from the flame based on a spectral ratio between a wavelength obtained from the main infrared sensor and a wavelength obtained from the sub infrared sensor.

12. The flame detector according to claim 6, wherein the plurality of output ratios comprises 12 output ratios, the first quantity of output ratios comprises 2 or more output ratios, the first predetermined value is 3, the second quantity of output ratios comprises 4 or more output ratios, the second predetermined value is 2, and the third predetermined value is 1.

* * * * *